United States Patent
Sun et al.

(10) Patent No.: US 10,505,434 B2
(45) Date of Patent: Dec. 10, 2019

(54) MOTOR AND APPLICATION APPARATUS UTILIZING THE SAME

(71) Applicant: JOHNSON ELECTRIC INTERNATIONAL AG, Murten (CH)

(72) Inventors: Chiping Sun, Hong Kong (CN); Fei Xin, Shenzhen (CN); Shinghin Yeung, Hong Kong (CN); Xiuwen Yang, Shenzhen (CN); Shujuan Huang, Shenzhen (CN); Yunlong Jiang, Shenzhen (CN)

(73) Assignee: JOHNSON ELECTRIC INTERNATIONAL AG, Murten (CH)

(*) Notice: Subject to any disclaimer, the term of this patent is extended or adjusted under 35 U.S.C. 154(b) by 60 days.

(21) Appl. No.: 15/812,089

(22) Filed: Nov. 14, 2017

(65) Prior Publication Data

US 2018/0138791 A1    May 17, 2018

(30) Foreign Application Priority Data

Nov. 15, 2016  (CN) .......................... 2016 1 1026877
Dec. 30, 2016  (CN) .......................... 2016 1 1260093

(51) Int. Cl.
| | | |
|---|---|---|
| H02K 19/04 | (2006.01) |
| H02P 1/04 | (2006.01) |
| H02K 29/08 | (2006.01) |
| H02K 21/16 | (2006.01) |
| H02K 11/215 | (2016.01) |
| H02P 1/00 | (2006.01) |
| H02P 6/20 | (2016.01) |
| H02P 6/15 | (2016.01) |
| H02K 1/14 | (2006.01) |

(52) U.S. Cl.
CPC .......... *H02K 19/04* (2013.01); *H02K 11/215* (2016.01); *H02K 21/16* (2013.01); *H02K 29/08* (2013.01); *H02P 1/00* (2013.01); *H02P 1/04* (2013.01); *H02P 6/15* (2016.02); *H02P 6/20* (2013.01); *H02K 1/14* (2013.01)

(58) Field of Classification Search
CPC ...... H02K 19/04; H02K 11/215; H02K 21/16; H02K 29/08; H02P 1/00; H02P 1/04; H02P 6/20
USPC ........................................... 310/46
See application file for complete search history.

(56) References Cited

U.S. PATENT DOCUMENTS

| | | | |
|---|---|---|---|
| 2004/0145336 A1* | 7/2004 | Marioni ................. | H02K 29/08 318/717 |
| 2012/0091832 A1* | 4/2012 | Soderberg ................. | C08J 3/00 310/44 |
| 2014/0160824 A1* | 6/2014 | Inomata ................. | H02M 5/293 363/150 |

* cited by examiner

*Primary Examiner* — Terrance L Kenerly
(74) *Attorney, Agent, or Firm* — Muncy, Geissler, Olds & Lowe, P.C.

(57) ABSTRACT

A motor and an application apparatus are provided. The motor includes a stator having a stator core and a stator winding wound on the stator core, a rotor, a magnetic sensor configured to detect a magnetic field polarity of the rotor and output a corresponding signal, and a motor driving circuit configured to drive the rotor to rotate with respect to the stator based on the signal output from the magnetic sensor. At a rest position of the rotor, the magnetic sensor is arranged with an advance angle with respect to a polar axis of the rotor, to make the motor have a high starting torque.

11 Claims, 8 Drawing Sheets

MOTOR AND APPLICATION APPARATUS UTILIZING THE SAME

CROSS REFERENCE TO RELATED APPLICATIONS

This non-provisional patent application claims priority under 35 U. S. C. § 119(a) from Patent Application No. 201611026877.3 filed in The People's Republic of China on Nov. 15, 2016 and Patent Application No. 201611260093.7 filed in The people's Republic of China on Dec. 30, 2016, the entire contents of which are hereby incorporated by reference.

FIELD OF THE INVENTION

This present disclosure relates to a motor, and more particularly to a motor with a high starting torque, and an application apparatus employing the motor.

BACKGROUND OF THE INVENTION

During a starting process of a synchronous motor, an electromagnet of a stator generates an alternating magnetic field, dragging a permanent magnet rotor to oscillate. If the rotor obtains enough kinetic energy, oscillation amplitude of the rotor will keep increasing, and finally a rotational speed of the rotor will be rapidly accelerated to be synchronize with the alternating magnetic field of the stator.

In practice, when the motor starts from a rest position, a current in a stator winding does not change suddenly due to physical characteristics of the winding, so the current in the stator winding rams up slowly. An input power $P_{input}$ to the motor also rams up slowly, as the input power $P_{input}$ can be expressed in terms of as $P_{input}=V_{Bemf} \times I_{motor}$, wherein $V_{Bemf}$ is the back electromotive force, and I is current in the stator winding. If the input power $P_{input}$ is not large enough to overcome starting friction between a shaft and a shaft sleeve of the motor, and inertia of a motor load such as a pump or a fan, the motor will keep a resting state and will not start normally even if powered on.

SUMMARY

Thus, there a desire for a motor and an application apparatus employing the motor, which have a high starting torque.

According to one aspect, a motor is provided, which includes a stator, a rotor, a magnetic sensor, and a motor driving circuit. The stator includes a stator core and a stator winding wound on the stator core. The magnetic sensor is configured to detect a magnetic field polarity of the rotor and output a corresponding signal. The motor driving circuit is configured to drive the rotor to rotate with respect to the stator based on the signal output from the magnetic sensor. At a rest position of the rotor, the magnetic sensor is arranged with an advance angle with respect to a polar axis of the rotor.

Preferably, in a case that the rotor rotates in a counterclockwise direction, the magnetic sensor is arranged with a counterclockwise offset with respect to the polar axis of the rotor to form the advance angle; in a case that the rotor rotates in a clockwise direction, the magnetic sensor is arranged with a clockwise offset with respect to the polar axis of the rotor to form the advance angle.

Preferably, an electrical angle of the advance angle is less than 90/N degrees, wherein N is the number of pairs of magnetic poles of the rotor.

Preferably, the electrical angle of the advance angle is greater than or equal to 15 degrees, and less than or equal to 45 degrees.

Preferably, the electrical angle the advance angle is 15 degrees, 20 degrees, 25 degrees, 30 degrees, 35 degrees or 40 degrees.

Preferably, the motor driving circuit comprises a controllable bidirectional AC switch and a switch control circuit, the controllable bidirectional AC switch and the stator winding are connected in series between two terminals of a AC power supply, and the switch control circuit is configured for controlling the controllable bidirectional AC switch to turn on or turn off, based on the signal output from the magnetic sensor and a current voltage polarity of the AC power supply, to control the motor to rotate in a predetermined direction.

Preferably, the switch control circuit is configured to turn on the controllable bidirectional AC switch in a case that the AC power supply is in a positive half-cycle and the magnetic sensor detects that a magnetic field of the rotor has a first polarity, or in a case that the AC power supply is in a negative half-cycle and the magnetic sensor detects that the magnetic field of the rotor has a second polarity opposite to the first polarity; and turn off the controllable bidirectional AC switch in a case that the AC power supply is in a negative half-cycle and the magnetic sensor detects that the magnetic field of the rotor has a first polarity, or in a case that the AC power supply is in a positive half-cycle and the magnetic sensor detects that the magnetic field of the rotor has the second polarity.

Preferably, the motor further comprises a rectifying circuit at least configured for supplying a DC voltage to the magnetic sensor, wherein the rectifying circuit comprises two input terminals respectively connected to a first node and a second node, the stator winding and the controllable bidirectional AC switch are connected in series between the first node and the second node, and the AC power supply is connected between the first node and the second node.

Preferably, the motor further comprises a rectifying circuit at least configured for supplying a DC voltage to the magnetic sensor, wherein the rectifying circuit comprises two input terminals respectively connected to a first node and a second node, the AC power supply and the stator winding are connected in series between the first node and the second node, and the controllable bidirectional AC switch is connected between the first node and the second node.

Preferably, the motor is a brushless direct current motor.

According to another aspect, an application apparatus is provided, which includes the above-described motor.

Preferably, the application apparatus is a fan, a water pump, or an electric vehicle.

In the embodiments of the present disclosure, the magnetic sensor is arranged with an advance angle with respect to the polar axis of the rotor, so the period of time that the position sensor detects the magnetic field polarity of the rotor is extended, and the current flows into the stator winding earlier or for a longer period of time, and thus increasing the input power to the motor. As such, the motor generates a high starting torque to overcome the motor starting friction and the inertia of load, and starts successfully. The motor efficiency is improved accordingly.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

The subject matter will be described in conjunction with the accompanying drawings and the preferred embodiments. The described embodiments are only a few and not all of the embodiments of the present disclosure. All other embodiments obtained by those ordinarily skilled in the art based on the embodiments of the present disclosure without any creative efforts fall within the protection scope of the present disclosure. It is to be understood that, the drawings are provided for reference only and are not intended to be limiting of the invention. The dimensions shown in the drawings are only for convenience of illustration and are not intended to be limiting.

It should be noted that when a component is considered to be "connected" to another component, it can be directly connected to another component or may also have a centered component. Unless otherwise defined, all technical and scientific terms used herein have the same meaning as commonly understood by those ordinarily skilled in the art. The terminology used in the specification of the present disclosure is only for the purpose of describing particular embodiments and is not intended to limit the invention.

Figure 1:
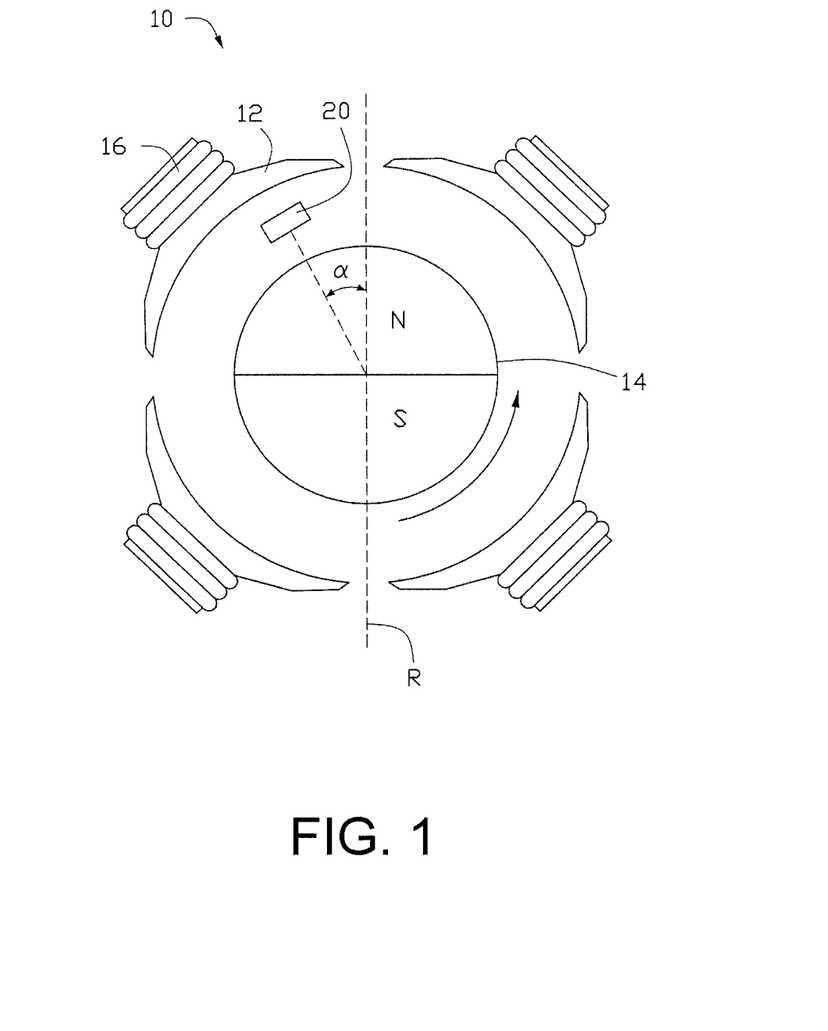
FIG. 1 is a schematic diagram of a motor according to a preferred exemplary embodiment of the present disclosure.

FIG. 1 schematically shows a motor 10 according to an embodiment of the present disclosure. The motor 10 takes a synchronous motor as an example. The motor 10 includes a stator and a permanent magnet rotor 14 rotatably disposed within magnetic poles of the stator. The stator includes a stator core 12 and a stator winding 16 wound on the stator core 12. The rotor 14 is a permanent magnet rotor.

In this embodiment, the rotor 14 has two magnetic poles as an example. Each magnetic pole may be made from a neodymium magnet material extracted from rare earth, or further wrapped with a rubber to be more durable. The polar axis R of the rotor 14 refers to a virtual connection line passing through two centers of two symmetrical magnetic poles (two pieces of magnets in this embodiment) along a diameter of the rotor 14. The central axis of the stator refers to a virtual connection line passing through two centers of two symmetrical magnetic poles along a diameter of the stator. Preferably, pole arc surface of the stator poles are concentric with the rotor thus forming a uniform main air gap. The pole arc surface defines an inwardly-recessed startup groove (not shown), such that a non-uniform air gap is defined between the startup groove and an outer surface of the rotor 14. As such, the polar axis R of the rotor 14 has an angular offset relative to the central axis of the stator when the rotor 14 is at rest, and thus the rotor 14 has a fixed starting position every time the stator winding 16 is energized. It can be understood that, in other embodiments, the rotor may also have more than two magnetic poles, such as 4 or 6 magnetic poles. The stator may also have two, four, six, or more magnetic poles.

A magnetic sensor 20 is disposed on/within the stator and at a position close to the rotor 14. The magnetic sensor 20 is configured for detecting a magnetic field polarity of the rotor 14 and variation of the magnetic field polarity. At a rest position of the rotor 14, the magnetic sensor 20 is arranged with an offset with respect to the polar axis R of the rotor 14, to form an advance angle α. If the rotor 14 rotates in a counterclockwise direction, the magnetic sensor 20 is arranged with a counterclockwise offset with respect to the polar axis R of the rotor 14. If the rotor 14 rotates in a clockwise direction, the magnetic sensor 20 is arranged with a clockwise offset with respect to the polar axis R of the rotor 14. An electrical angle of the advance angle α may be less than or equal to 90/N degrees, wherein N is the number of pairs of the magnetic poles of the rotor 14. Preferably, N is the number of the magnetic poles of the rotor 14. In this embodiment, the electrical angle of advance angle α is less than 90 degrees and greater than 0 degree. Preferably, the electrical angle of the advance angle α is greater than or equal to 15 degrees, and less than or equal to 45 degrees. More preferably, the electrical angle of the advance angle α may be 15 degrees, 20 degrees, 25 degrees, 30 degrees, 35 degrees or 40 degrees.

Figure 2:
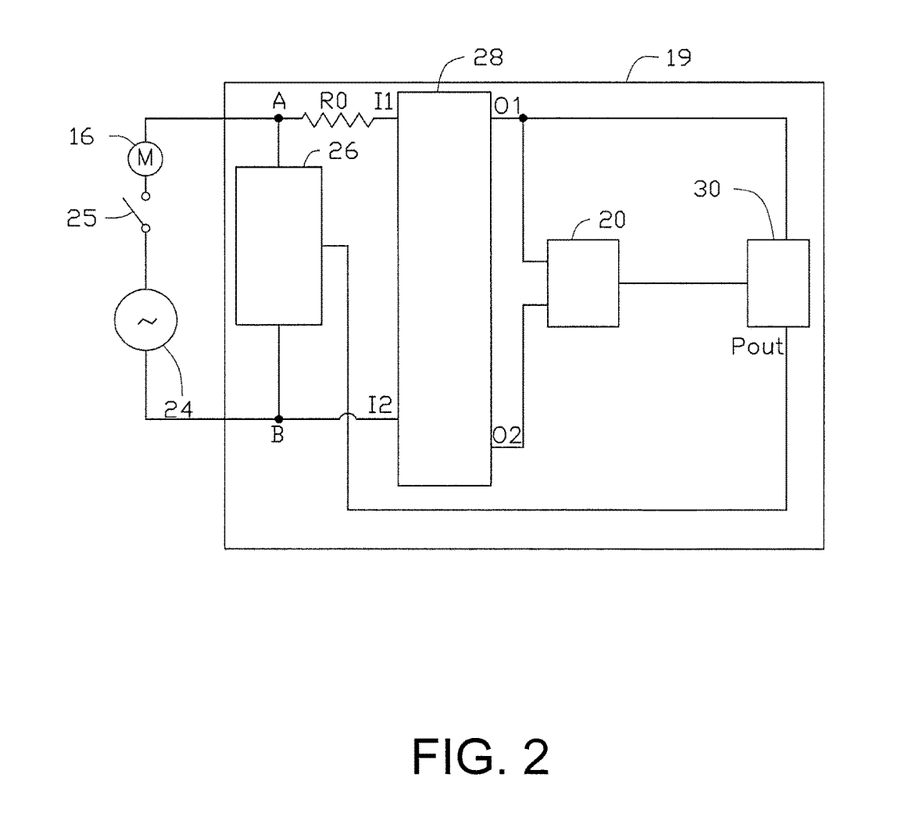
FIG. 2 is a block diagram of a motor driving circuit of the motor of FIG. 1 according to a first embodiment of the present disclosure.

FIG. 2 is a block diagram of a motor driving circuit of the motor 10 according to a first embodiment of the present disclosure. The motor driving circuit 19 includes the magnetic sensor 20, a rectifying circuit 28, a controllable bidirectional alternating current (AC) switch 26, and a switch control circuit 30. The stator winding 16 of the motor 10, a power switch 25 for starting or stopping the motor 10, and an alternating current (AC) power supply 24 are connected in series between the first node A and the second node B. Two terminals of the controllable bidirectional AC switch 26 are respectively connected to the first node A and the second node B. The first input end I1 and the second input end I2 of the rectifying circuit 28 are respectively connected to the first node A and the second node B. Preferably, the first input end I1 is connected to the first node A via a resistor R0.

The rectifying circuit 28 is configured for converting an AC power into a low-voltage direct current (DC) power. The magnetic sensor 20 is powered by the low-voltage DC power, and configured for detecting the magnetic field polarity of the rotor 14, and output a corresponding signal at its output terminal. The detected magnetic field polarity of the rotor 14 can reflect the positions of the magnetic poles of the rotor 14, so the magnetic sensor 20 may also be referred as a position sensor. The switch control circuit 30 is connected to the rectifying circuit 28 and the magnetic sensor 20. The output terminal Pout of the switch control circuit 30 is connected to a control terminal of the controllable bidirectional AC switch 26. The switch control circuit 30 is configured for controlling the controllable bidirectional AC switch 26 to be switched between a switch-on state and a switch-off state in a predetermined way, based on the magnetic field polarity of the rotor 14 detected by the magnetic sensor 20 and a voltage polarity of the AC power supply 24. As a result, the stator winding 16 will drag the rotor 14 to rotate in a predetermined starting direction. In the embodiment as shown in FIG. 1, the rotor 14 rotates in a counterclockwise direction.

The AC power supply 24 may be a commercial AC power supply, for example, 220V or 230V, or an AC power supply output from an inverter. The magnetic sensor 20 is preferably a Hall sensor.

Figure 3:
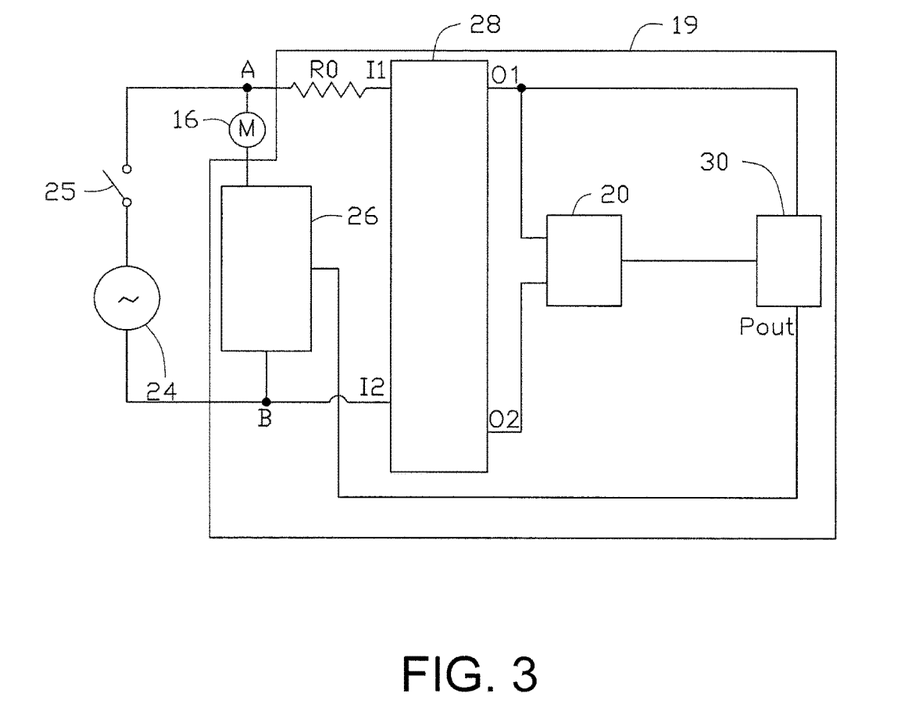
FIG. 3 is a block diagram of a motor driving circuit of the motor of FIG. 1 according to a second embodiment of the present disclosure.

In other embodiments, referring to FIG. 3, the stator winding 16 and the controllable bidirectional AC switch 26 are connected in series between the first node A and the second node B. The first terminal of the AC power supply 24 is connected to the first node A via the power switch 25, and the second terminal of the AC power supply 24 is connected to the second node B. As such, the stator winding 16 and the controllable bidirectional AC switch 26 are still connected between the first terminal and the second terminal of the AC power supply 24.

Figure 4:
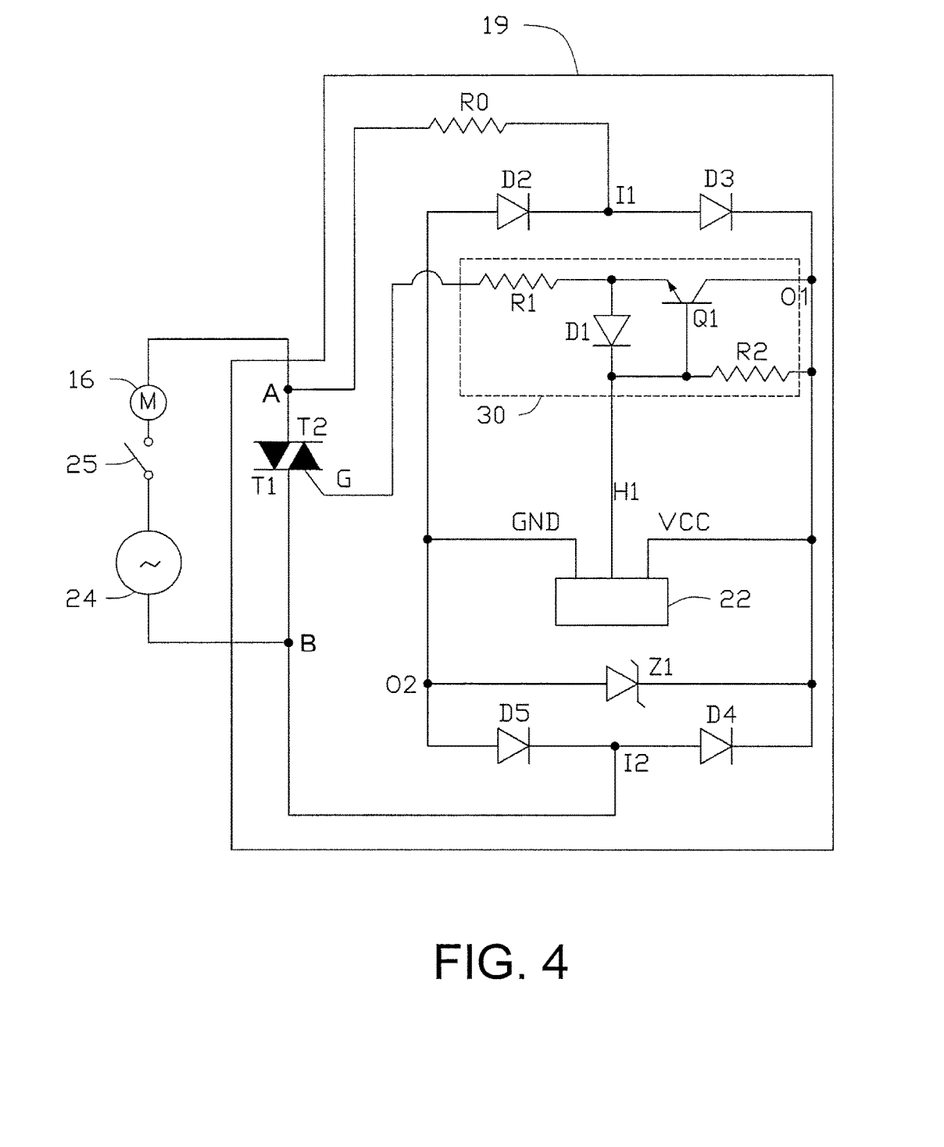
FIG. 4 is a circuit diagram of the motor driving circuit of FIG. 2 according to a preferred exemplary embodiment of the present disclosure.

Referring to FIG. 4, which is a circuit diagram of the motor driving circuit 19 of FIG. 2 according to a preferred exemplary embodiment of the present disclosure. The rectifying circuit 28 includes four diodes D2, D3, D4, and D5. The cathode of the diode D2 is connected to the anode of the diode D3. The cathode of the diode D3 is connected to the cathode of the diode D4. The anode of the diode D4 is connected to the cathode of the diode D5. The anode of the diode D5 is connected to the anode of the diode D2. The cathode of the diode D2 being the first input I1 of the rectifying circuit 28 is connected to the stator winding 16 of the motor 10 via the resistor R0. The anode of the diode D4 being the second input terminal 12 of the rectifier circuit 28 is connected to the AC power supply 24. The cathode of the diode D3 being the first output end O1 of the rectifying circuit 28 is connected to an Hall sensor 22 and the switch control circuit 30. The anode of the diode D5 being the second output end O2 of the rectifying circuit 28 is connected to the Hall sensor 22. The first output end O1 outputs a relatively high DC operating voltage. The second output end O2 outputs a relatively low DC operating voltage. Preferably, a voltage stabilizing circuit such as a Zener diode Z1, is connected between the first output end O1 and the second output end O2 of the rectifying circuit 28. The anode of the Zener diode Z1 is connected to the second output end O2, and the cathode of the Zener diode Z1 is connected to the first output end O1.

In this embodiment, the Hall sensor 22 includes a power terminal VCC, a grounding terminal GND and an output terminal H1. The power terminal VCC is connected to the first output end O1 of the rectifying circuit 28. The grounding terminal GND is connected to the second output end O2 of the rectifying circuit 28. The output terminal H1 is connected to the switch control circuit 30. In the case that the Hall sensor 22 is powered normally, that is, the power terminal VCC receives a relatively high voltage and the grounding terminal GND receives a relatively low voltage, the output terminal H1 thereof outputs a logic high level when detecting the magnetic field of the rotor 14 is North, and outputs a logic low level when detecting the magnetic field of the rotor 14 is South.

The switch control circuit 30 includes a first current path with a current flowing to a control terminal G of the controllable bidirectional AC switch 26, a second current path with a current flowing from the control terminal G. The first current path is connected between the control terminal G and the first output end O1 of the rectifying circuit 28. The second current path is connected between the control terminal G and the second output end O2 of the rectifying circuit 28. The switch control circuit 30 further includes a first switch and a second switch. The first switch is connected in the first current path. The second switch is connected in the second current path.

In this embodiment, the controllable bidirectional AC switch 26 is a Triode AC semiconductor switch (TRIAC). The two anodes T2, T1 of the TRIAC are respectively connected to the first node A and the second node B. The switch control circuit 30 includes a first terminal, a second terminal, and a third terminal which is the output terminal Pout of the switch control circuit 30. The first terminal is connected to the first output end O1 of the rectifying circuit 28, the second terminal is connected to the output terminal H1 of the Hall sensor 22, and the third terminal is connected to the control terminal G of the TRIAC. The switch control circuit 30 includes a resistor R2, an NPN transistor Q1 as the first switch, a diode D1 as the second switch, and a resistor R1. The diode D1 and the resistor R1 are connected in series between the output terminal H1 of the Hall sensor 22 and the control terminal G of the TRIAC. The cathode of the diode D1 being the second terminal of the switch control circuit 30 is connected to the output terminal H1 of the Hall sensor 22. One terminal of the resistor R2 is connected to the first output end O1 of the rectifying circuit 28, another terminal of the resistor R2 is connected to the output terminal H1 of the Hall sensor 22. The base of the NPN transistor Q1 is connected to the output terminal H1 of the Hall sensor 22, the emitter of the NPN transistor Q1 is connected to the anode of the diode D1, and the collector of the NPN transistor Q1 is connected to the first output end O1 of the rectifying circuit 28 as the first terminal of the switch control circuit 30. The end of the resistor R1 connected to the control terminal G of the TRIAC is the third terminal of the switch control circuit 30.

It can be understood that, the controllable bidirectional AC switch 26 also may formed by one or more of a metal-oxide semiconductor field effect transistor, a silicon-controlled rectifier, a bidirectional triode thyristor, an insulated gate bipolar transistor, a bipolar junction transistor, a thyristor, and an optocoupler. Examples include: two metal-oxide semiconductor field effect transistors may form the controllable bidirectional AC switch; two silicon-controlled rectifiers may form the controllable bidirectional AC switch; two insulated gate bipolar transistors may form the controllable bidirectional AC switch; and two bipolar junction transistors may form the controllable bidirectional AC switch.

Figure 5:
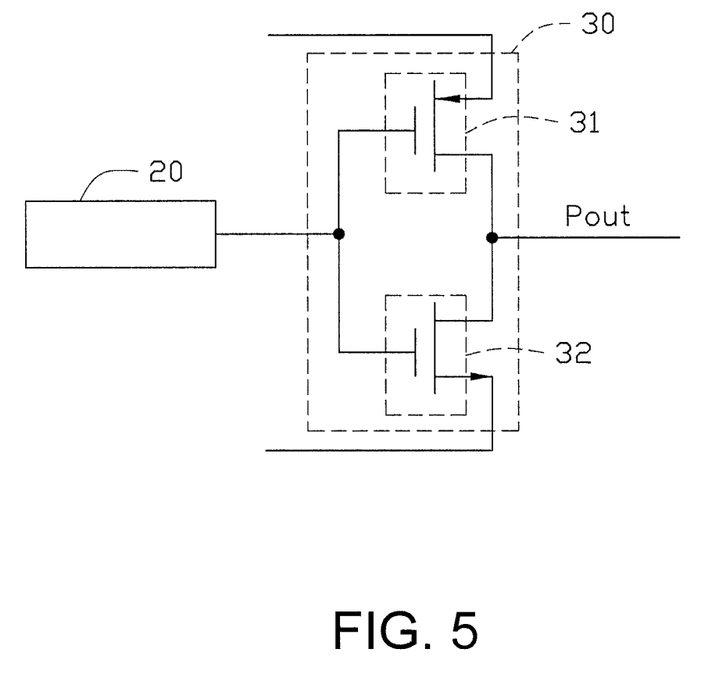
FIGS. 5-7 are alternate circuit diagrams of a switching control circuit of FIGS. 2-4 in accordance with some embodiments.

Referring to FIG. 5, in the embodiment, the first switch 31 and the second switch 32 are a pair of complementary semiconductor switches. The first switch 31 can be turned on by a low-level, and the second switch 32 can be turned on by a high-level. The first switch 31 and the output terminal Pout of the switch control circuit 30 are connected in the first current path. The second switch 32 and the output terminal Pout of the switch control circuit 30 are connected in the second current path. Both of the control terminals of the two switches 31, 32 are connected to the magnetic sensor 20. The current input terminal of the first switch 31 is connected to a relatively high voltage, preferably connected to the first output end O1 of the rectifying circuit 28. The current output terminal of the first switch 31 is connected to the current input terminal of the second switch 32. The current output terminal of the second switch 32 is connected to a relatively low voltage, preferably connected to the second output end O2 of the rectifying circuit 28. In the case that the magnetic sensor 20 outputs the logic low level, the first switch 31 will be turned on, the second switch 32 will be turned off, and the current will flows from the relatively high voltage to the output terminal Pout of the switch control circuit 30 via the first switch 31. In the case that the magnetic sensor 20 outputs the logic high level, the second switch 32 will be turned on, the first switch 31 will be turned off, and the current will flows from the output terminal Pout of the switch control circuit 30 to the relatively low voltage via the second switch 32. The first switch 31 may be a positive-channel MOSFET. The second switch 32 may be a negative-channel MOSFET. It can be understood that, in other embodiments, the two switches 31, 32 also may be other types of semiconductor switches, such as junction field effect transistor (JFET).

In alternative embodiments, the switch control circuit 30 also may comprise only one switch, and the above described first current path and second current path. The switch is arranged in one of the first current path and the second current path. The switch is controlled by the magnetic sensor 20, such that the first current path and the second current path are selectively turned on.

Figure 6:
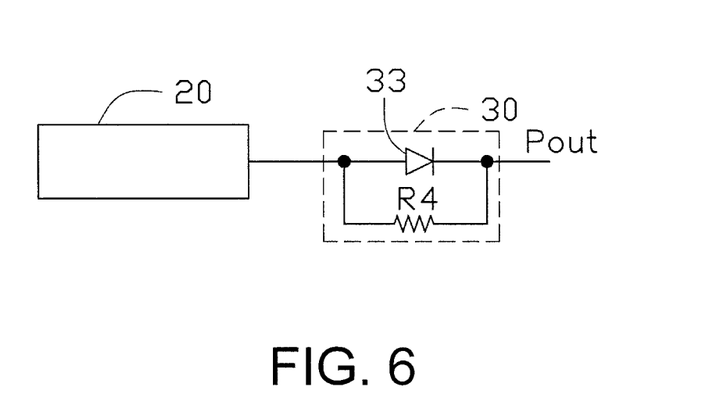

Referring to FIG. 6, in this embodiment, the switch control circuit 33 includes a unidirectional conduction switch 33, and a resistor R4. The unidirectional conduction switch 33 is preferably a diode. The output terminal of the magnetic sensor 20 is connected to the output terminal Pout of the switch control circuit 30 via the anode and the cathode of the diode. The resistor R4 is connected in parallel with the unidirectional conduction switch 33. The unidirectional conduction switch 33 and the output terminal Pout are connected in the first current path. The resistor R4 and the output terminal Pout are connected in the second current path. In the case that the magnetic sensor 20 outputs a logic high level, the unidirectional conduction switch 33 will be turned on, and a current will flows from the magnetic sensor 20 to the output terminal Pout. In the case that the magnetic sensor 20 outputs a logic low level, the unidirectional conduction switch 33 will be turned off, and a current will flows from the output terminal Pout to the magnetic sensor 22 via the resistor R4. In alternative embodiments, the resistor R4 also may be another unidirectional conduction switch connected in anti-parallel with the unidirectional conduction switch 33. In this way, the current flowing from the output terminal Pout and the current flowing into the output terminal Pout are relatively balanced.

Figure 7:
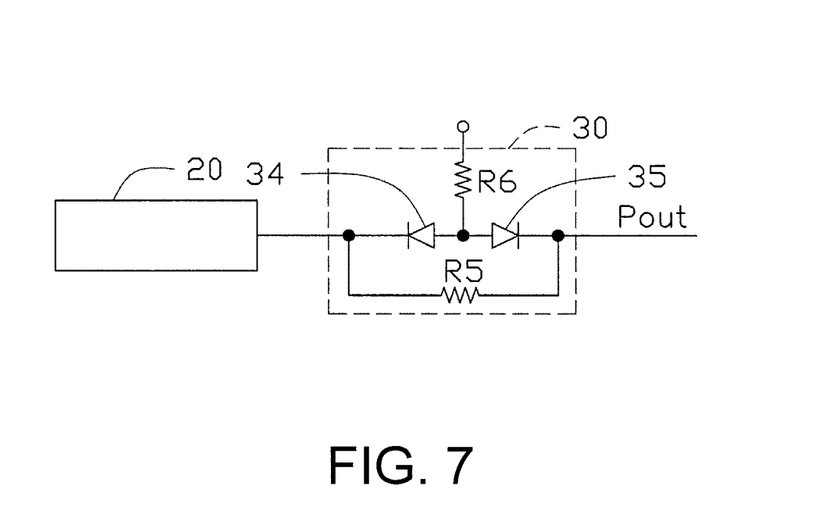

Referring to FIG. 7, in this embodiment, the switch control circuit 30 includes a diode 34 and a diode 35 connected in reverse series between the output terminal of the magnetic sensor 20 and the output terminal Pout, a resistor R5 connected between the output terminal of the magnetic sensor 20 and the output terminal Pout, and a resistor R6 connected between a power source and a common node of the diodes 34 and 35. The cathode of the diode 34 is connected to the output terminal of the magnetic sensor 20. The power source is preferably from the first output end O1 of the rectifying circuit 28. The diode 34 is controlled by the magnetic sensor 20. In the case that the magnetic sensor 20 outputs a logic high level, the diode 34 will be turned off, and a current will flows from the power source to the output terminal Pout via the resistor R6 and the diode 35. In the case that the magnetic sensor 20 outputs a logic low level, a current will flows from the output terminal Pout to the magnetic sensor 20 via the resistor R5.

In the above embodiments, the switch control circuit 30 is configured to turn on the controllable bidirectional AC switch 26 in the case that the AC power supply is in a positive half-cycle and the magnetic sensor 20 detects that the magnetic field of the rotor 14 has a first polarity, or in the case that the AC power supply is in a negative half-cycle and the magnetic sensor 20 detects that the magnetic field of the rotor 14 has a second polarity opposite to the first polarity; and turn off the controllable bidirectional alternating current switch 26 in the case that the AC power supply is in a negative half-cycle and the magnetic sensor 20 detects that the magnetic field of the rotor 14 has a first polarity, or in the case that the AC power supply is in a positive half-cycle and the magnetic sensor 20 detects that the magnetic field of the rotor 14 has the second polarity. In some embodiments, the first polarity is North, and the second polarity is South. In some other embodiments, the first polarity may be South, and the second polarity may be North.

In the case that the controllable bidirectional AC switch 26 is in the turn-on state, the switch control circuit 30 controls the current direction to be switched between a first state of flowing from the first output end O1 of the rectifying circuit 28 to the control terminal of the controllable bidirectional AC switch 26 and a second state of flowing from the control terminal of the controllable bidirectional AC switch 26 to the second output end O2 of the rectifying circuit 28. In some embodiments, the first state can be immediately switched to the second state. In some preferably embodiments, a time interval is defined between the first state and the second state. During the time interval, there is no current flowing through the control terminal of the controllable bidirectional AC switch 26.

Specifically, in the case that the AC power supply 24 is in the positive half-cycle and the magnetic sensor 20 detects that the magnetic field of the rotor 14 has the first polarity, the current flows from the first output end O1 of the rectifying circuit 28 to the control terminal of the controllable bidirectional AC switch 26. In the case that the AC power supply 24 is in the negative half-cycle and the magnetic sensor 20 detects that the magnetic field of the rotor 14 has the second polarity, the current flows from the control terminal of the controllable bidirectional AC switch 26 to the second output end O2 of the rectifying circuit 28.

Figure 8A:
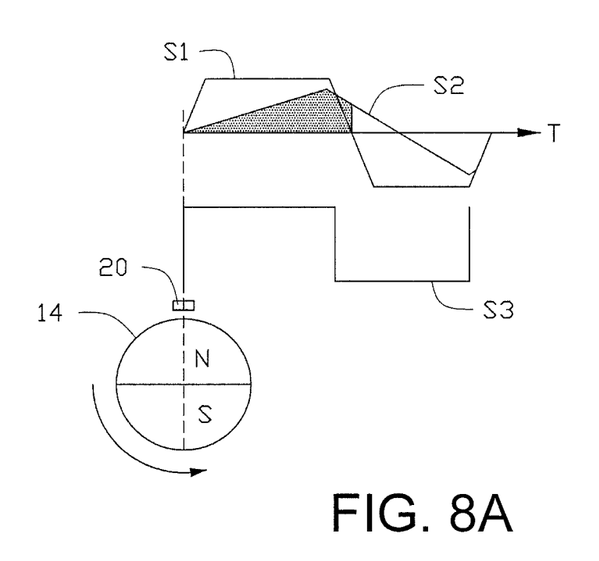
FIG. 8A and FIG. 8B are comparison diagrams of an input power of a motor according to the conventional technology and an input power of a motor according to an implementation of the present disclosure.
Figure 8B:
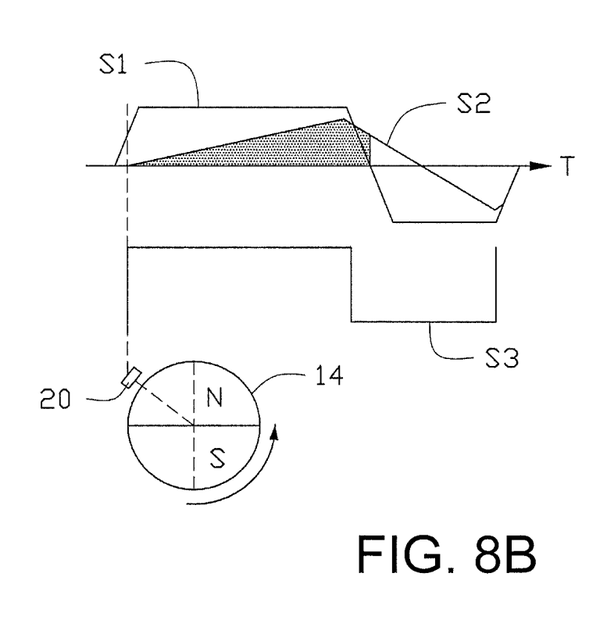

Referring to FIG. 8A and FIG. 8B, curves S1 indicate back electromotive forces, curves S2 indicate currents in stator windings, curves S3 indicate signals outputted by the magnetic sensors, and shadows in the FIGs indicate input powers $P_{input}$ of the motor.

When the motor starts, the power switch 25 is turned on, and the motor is powered on. The magnetic sensor 20 detects the magnetic field of the rotor is North, and the AC power supply 24 is in the positive half-cycle. As a consequence, the switch control circuit 30 outputs a signal to turn on the controllable bidirectional AC switch 26, hence, the current in the stator winding 16 increases gradually. As the magnetic sensor 20 is arranged with a counterclockwise offset with respect to the polar axis R of the rotor 14 to form the advance angle α, a period of time that the position sensor 20 detects the North magnetic field is extended, compared with that of a design according to the conventional technology in which a magnetic sensor is arranged at the polar axis R of the rotor (FIG. 8A). As shown from the comparison of FIG. 8A and FIG. 8B, the area of the shadow in FIG. 8B, that is, the input power $P_{input}$ ($P_{input} = V_{Bemf} \times I_{motor}$, wherein $V_{Bemf}$ is the back electromotive force, $I_{motor}$ is the current in stator winding), is greatly increased, compared with the area of the shadow in FIG. 8A. The input power $P_{input}$ is a means by which the motor generates mechanical work. The increased input power $P_{input}$ will provide a larger starting torque to overcome starting friction of the motor and inertia of the motor load such as a pump or a fan, so that the motor can be started and accelerated successfully. Then, the controllable bidirectional AC switch 26 is still turned on or turned off according to the voltage polarity of the AC power supply 24 and the magnetic field polarity of the rotor 14, so that the rotational speed of the rotor 14 is rapidly pulled to be synchronize with the alternating magnetic field of the stator winding 16.

Figure 9:
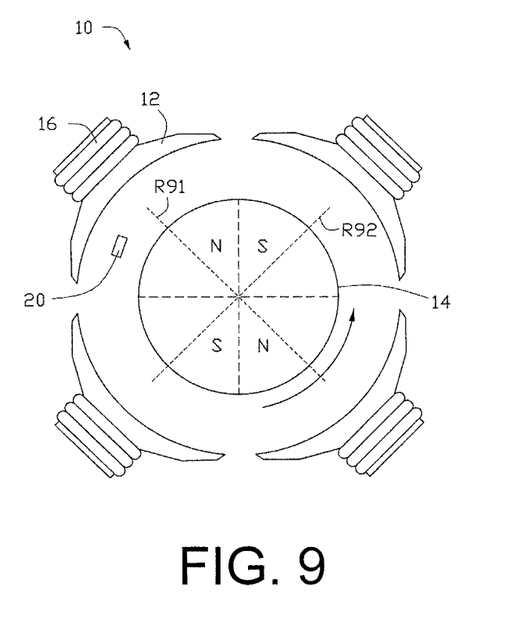
FIG. 9 illustrates a position of a magnetic sensor of the motor in accordance with some embodiments, wherein a rotor of the motor has four magnetic poles.
Figure 10:
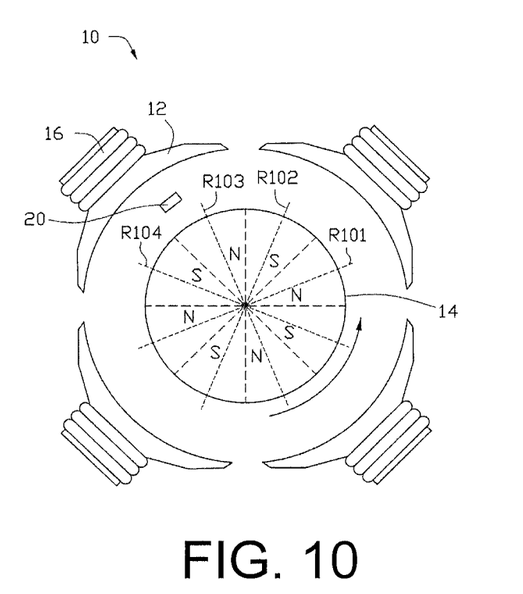
FIG. 10 illustrates a position of a magnetic sensor of the motor of in accordance with some embodiments, wherein a rotor of the motor has eight magnetic poles.

It can be understood that, the rotor 14 may have a plurality of magnetic poles. For example, the rotor 14 may have four magnetic poles, and two polar axes R91, R92, as shown in FIG. 9. The rotor 14 also may have eight magnetic poles, and four polar axes R101, R102, R103, and R104, as shown in FIG. 10. In these embodiments, at a rest position of the rotor 14, the magnetic sensor 20 can be arranged with an offset with respect to any one of polar axes of the rotor 14 to form the advance angle α, to extend the period of time that the position sensor 20 detects the current magnetic field of the rotor 14, and thus providing a high starting torque.

It can be understood that, the rotor 14 may also be made of other materials such as ferrite, neodymium iron boron, and alnico. The waveform of the back electromotive force $V_{Bemf}$ may also be different, such as sine waveform.

In the above embodiments, the rectifying circuit 28 is a full bridge rectification circuit. In other embodiments, a half bridge rectification circuit, a full-wave rectification circuit, a half-wave rectification circuit, or the like, may be adopted. In the embodiment, the rectified voltage is stabilized via the Zener diode Z1. In other embodiments, the voltage may be stabilized via other electronic components such as a three terminal voltage stabilizer.

It can be understood that, the motor driving circuit 19 can be totally or partially integrated in an integrated circuit, which may be achieved, for example, by a single ASIC chip, to reduce cost of the circuit and increase reliability of the circuit. The integrated circuit includes a housing, a plurality of pins extending from the housing, and a semiconductor substrate encapsulated in the housing. A portion of the motor driving circuit 19 encapsulated in the integrated circuit is disposed on the semiconductor substrate. The motor driving circuit 19 may also be a programmable integrated circuit, such as a field programmable gate array (FPGA), a gate array logic (GAL), a programmable array logic (PAL), a programmable logic device (PLD), etc.

In some embodiments, the rectifying circuit 28, the magnetic sensor 20 and the switch control circuit 30 are integrated in the integrated circuit. In some other embodiments, the magnetic sensor 20 and the switch control circuit 30 are integrated in the integrated circuit, and the rectifying circuit 28 and the controllable bidirectional AC switch 26 are arranged outside the integrated circuit. It can also be understood that, with the development of science and technology, more functional circuits in the switch control circuit 30 and the motor driving circuit 19 may be implemented by programmable integrated circuit, such as FPGA.

It can be understood, the motor described in the embodiments of the present disclosure is suitable for driving fans, water pumps, and electric vehicles (the electric vehicle includes a low or high voltage AC power supplies, otherwise an inverter is required to drive the permanent magnet AC motor). The motor according to the embodiments of the present disclosure is a AC motor with permanent magnet rotor, such as synchronous motor and brushless direct current (BLDC) motor. The motor according to the embodiments of the present disclosure is preferably a single-phase AC motor with permanent magnet rotor, such as a single-phase synchronous motor and a single-phase BLDC motor. When the motor is a synchronous motor; the AC power supply may be commercial AC power supply. When the motor is a BLDC motor, the AC power supply may be provided by an inverter.

In the embodiments of the present disclosure, the magnetic sensor 20 is arranged with an offset with respect to the polar axis of the rotor 14, to form the advance angle α, so the period of time that the position sensor 20 detects the magnetic field of the rotor is extended, and the current flows into the stator winding 16 earlier or for a longer period of time, and thus increasing the input power $P_{input}$ to the motor 10. As such, the motor produces a high starting torque to overcome the motor starting friction and inertia of load, and start successfully. The motor efficiency is improved accordingly.

The above descriptions are only preferred embodiments of the present disclosure, and are not to limit the present disclosure. Any changes, equivalents, modifications and the like, which are made within the spirit and principle of the present disclosure, shall fall within the protection scope of the present disclosure.

The invention claimed is:
1. A motor, comprising:
   a stator comprising a stator core and a stator winding wound on the stator core;
   a rotor,
   a magnetic sensor, configured to detect a magnetic field polarity of the rotor and output a corresponding signal; and
   a motor driving circuit, configured to drive the rotor to rotate with respect to the stator based on the signal output from the magnetic sensor;
   wherein, at a rest position of the rotor, the magnetic sensor is arranged with an advance angle with respect to a polar axis of the rotor;
   the motor driving circuit comprises a controllable bidirectional AC switch and a switch control circuit, the controllable bidirectional AC switch and the stator winding being connected in series between two terminals of a AC power supply; and
   the switch control circuit is configured to turn on the controllable bidirectional AC switch in a case that the AC power supply is in a positive half-cycle and the magnetic sensor detects that the magnetic field of the rotor has a first polarity, or in a case that the AC power supply is in a negative half-cycle and the magnetic sensor detects that the magnetic field of the rotor has a second polarity opposite to the first polarity; and turn off the controllable bidirectional AC switch in a case that the AC power supply is in a negative half-cycle and the magnetic sensor detects that the magnetic field of the rotor has the first polarity, or in a case that the AC power supply is in a positive half-cycle and the magnetic sensor detects that the magnetic field of the rotor has the second polarity.

2. The motor according to claim 1, wherein, in a case that the rotor rotates in a counterclockwise direction, the magnetic sensor is arranged with a counterclockwise offset with respect to the polar axis of the rotor to form the advance angle; in a case that the rotor rotates in a clockwise direction, the magnetic sensor is arranged with a clockwise offset with respect to the polar axis of the rotor to form the advance angle.

3. The motor according to claim 1, wherein an electrical angle of the advance angle is less than 90/N degrees, wherein N is the number of pairs of magnetic poles of the rotor.

4. The motor according to claim 3, wherein the electrical angle of the advance angle is greater than or equal to 15 degrees, and less than or equal to 45 degrees.

5. The motor according to claim 4, wherein the electrical angle of the advance angle is 15 degrees, 20 degrees, 25 degrees, 30 degrees, 35 degrees or 40 degrees.

6. The motor according to claim 1, further comprising a rectifying circuit at least configured for supplying a DC voltage to the magnetic sensor, wherein the rectifying circuit comprises two input terminals respectively connected to a first node and a second node, the stator winding and the controllable bidirectional AC switch are connected in series between the first node and the second node, and the AC power supply is connected between the first node and the second node.

7. The motor according to claim 1, further comprising a rectifying circuit at least configured for supplying a DC voltage to the magnetic sensor, wherein the rectifying circuit comprises two input terminals respectively connected to a first node and a second node, the AC power supply and the stator winding are connected in series between the first node and the second node, and the controllable bidirectional AC switch is connected between the first node and the second node.

8. The motor according to claim 1, wherein the motor is a brushless direct current motor.

9. An application apparatus, wherein the application apparatus comprises the motor according to claim 1.

10. The application apparatus according to claim 9, wherein the application apparatus is a fan, a water pump, or an electric vehicle.

11. The motor according to claim 1, wherein the polar axis is a virtual connection line passing through two centers of two symmetrical magnetic poles along a diameter of the rotor, the advance angle is an angle of the magnetic sensor ahead of the polar axis in a rotational direction of the rotor; and an electrical angle of the advance angle is less than 90/N degrees, wherein N is the number of pairs of magnetic poles of the rotor.

* * * * *